(12) United States Patent
Allen et al.

(10) Patent No.: US 7,007,565 B2
(45) Date of Patent: Mar. 7, 2006

(54) GEAR ASSEMBLY HAVING NOISE-REDUCTION STRUCTURE AND POWER TAKE-OFF UNIT THEREWITH

(75) Inventors: Mark A. Allen, Tuscon, AZ (US); Randy P. Kruse, Southern Pines, NC (US); Matthew W. Shope, Beaver Falls, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/323,612

(22) Filed: Dec. 18, 2002

(65) Prior Publication Data

US 2003/0136212 A1    Jul. 24, 2003

Related U.S. Application Data

(60) Provisional application No. 60/341,446, filed on Dec. 18, 2001.

(51) Int. Cl.
*F16H 55/18*    (2006.01)

(52) U.S. Cl. .................... 74/333; 74/409; 74/421 R; 74/440

(58) Field of Classification Search ................ 74/333, 74/409, 421 R, 440, 443
See application file for complete search history.

(56) References Cited

U.S. PATENT DOCUMENTS

| | | | |
|---|---|---|---|
| 1,334,517 A * | 3/1920 | Bryan .................... | 74/440 |
| 1,629,564 A * | 5/1927 | Mercer ................... | 74/440 |
| 2,061,684 A | 11/1936 | Spence, Jr. | |
| 2,172,416 A | 9/1939 | Swenson | |
| 2,737,056 A * | 3/1956 | Baumgartner ............ | 74/409 |
| 2,896,466 A * | 7/1959 | Wiseman ................. | 74/440 |
| 3,174,356 A | 3/1965 | Michalec | |
| 4,519,264 A | 5/1985 | Inui | |
| 4,577,525 A | 3/1986 | Ikemoto et al. | |
| 4,881,422 A | 11/1989 | Maguire | |
| 5,025,894 A * | 6/1991 | Yamasaki ............ | 74/440 X |
| 5,771,745 A | 6/1998 | Goette et al. | |

FOREIGN PATENT DOCUMENTS

| | | | | |
|---|---|---|---|---|
| GB | 2215807 | * | 9/1989 | ............ 74/440 |
| JP | 401153865 | * | 6/1989 | ............ 74/440 |

* cited by examiner

*Primary Examiner*—Ha Ho
(74) *Attorney, Agent, or Firm*—MacMillan, Sobanski & Todd, LLC

(57) ABSTRACT

A meshing gear assembly includes a toothed disk that is supported on a first gear so as to be frictionally engaged therewith, but rotationally and radially movable relative thereto. The circumferential width of each tooth formed on the toothed disk is preferably larger than the circumferential width of each tooth formed on the first gear, and the outer diameter of the toothed disk can be larger than the outer diameter of the first gear. The first gear and the toothed disk mesh with a second gear such that as the second gear rotates, the toothed disk and the first gear also rotate. However, the toothed disk and the first gear rotate at different speeds because the difference in the number of teeth formed thereon. Because the teeth formed on the toothed disk have a larger circumferential thickness and a larger outer diameter than the teeth formed on the first gear, a tight meshing engagement with the second gear is provided. This tight meshing engagement, in combination with the frictional engagement of the toothed disk with the first gear, takes up backlash between the first gear and the second gear.

10 Claims, 3 Drawing Sheets

GEAR ASSEMBLY HAVING NOISE-REDUCTION STRUCTURE AND POWER TAKE-OFF UNIT THEREWITH

CROSS REFERENCE TO RELATED APPLICATION

This application claims the benefit of U.S. Provisional Application No. 60/341,446, filed Dec. 18, 2001, the disclosure of which is incorporated herein by reference.

BACKGROUND OF THE INVENTION

This invention relates in general to noise-reduction structures for use with meshing gear assemblies. In particularly, this invention relates to an improved noise-reduction structure for use with a meshing gear assembly in a power take-off unit.

Power take-off units are well known mechanical devices that are commonly used in conjunction with sources of rotational energy, such as vehicle engines and transmissions, for selectively providing power to one or more rotatably driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like. The power take-off unit provides a relatively simple and inexpensive mechanism for supplying rotational power from the vehicle engine to operate the rotatably driven accessory.

To accomplish this, a typical power take-off unit includes a rigid housing having a mounting surface formed thereon. An opening is formed through a portion of the mounting surface of the power take-off housing. An input gear is rotatably supported within the housing and includes a portion that extends outwardly through the opening formed through the mounting surface. The mounting surface of the power take-off unit housing is adapted to be secured (typically by a plurality of bolts) to a corresponding mounting surface formed on a case of a transmission provided on the vehicle. An opening is also formed through a portion of the mounting surface of the transmission case. When the power take-off unit housing is secured to the transmission case, the portion of the input gear extends through the opening formed through the transmission case into meshing engagement with one of the transmission gears, typically a transmission gear that is driven by the vehicle engine. As a result, the input gear of the power take-of unit is rotatably driven whenever the vehicle engine is operated.

The power take-off unit typically further includes an output gear that is rotatably supported within the housing. The output gear meshes with the input gear such that the output gear is rotatably driven by the input gear whenever the vehicle engine is operated. The output gear is, in turn, connected to an output shaft that is rotatably supported on the power take-off housing. The output shaft extends outwardly from the housing of the power take-off unit and is adapted to be connected to the rotatably driven accessory. In some instances, the output gear is directly connected to the output shaft. In those instances, the output shaft is rotatably driven by the output gear whenever the vehicle engine is operated. In other instances, however, the output gear is connected through a clutch assembly to the output shaft. The clutch assembly is provided within the power take-off housing for selectively connecting the output gear to the output shaft and, therefore, permitting selective or intermittent operation of the rotatably driven accessory whenever the vehicle engine is operated.

When a typical power take-off unit is operated, it often generates an undesirable amount of noise. Such noise usually results from the combination of torsional vibrations that are generated from the vehicle engine to the power take-off unit and backlash or looseness that typically exists between the meshing gears contained within the power take-off unit. It has been found that such torsional vibrations can cause the loosely meshing gears to rattle against one another as they are rotatably driven during use. Although the generation of such noise does not usually adversely affect the operation of the power take-off unit, it can be quite bothersome to persons that are located in the vicinity. A variety of noise-reduction structures for meshing gear assemblies are known in the art. However, such known noise-reduction structures have been found to be deficient for various reasons. Thus, it would be desirable to provide an improved noise-reduction structure for use with a meshing gear assembly in a power take-off unit.

SUMMARY OF THE INVENTION

This invention relates to an improved noise-reduction structure for use with a meshing gear assembly. The noise-reduction structure includes a toothed disk that is supported on a first gear, such as on an input gear of a power take-off unit. The toothed disk is supported on the first gear in such a manner as to be frictionally engaged therewith, but rotationally and radially movable relative thereto. The circumferential width of each tooth formed on the toothed disk is preferably larger than the circumferential width of each tooth formed on the first gear when measured at the operating pitch diameter thereof. Also, the outer diameter of the toothed disk can be larger than the outer diameter of the first gear. The first gear and the toothed disk mesh with a second gear, such as a transmission gear, such that as the second gear rotates, the toothed disk and the first gear also rotate. However, the toothed disk and the first gear rotate at different speeds because the difference in the number of teeth formed thereon. Because the teeth formed on the toothed disk have a larger circumferential thickness and a larger outer diameter than the teeth formed on the first gear, a tight meshing engagement with the second gear is provided. This tight meshing engagement, in combination with the frictional engagement of the toothed disk with the first gear, takes up backlash between the first gear and the second gear, thereby reducing the amount of noise that is generated during operation of the meshing gear assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
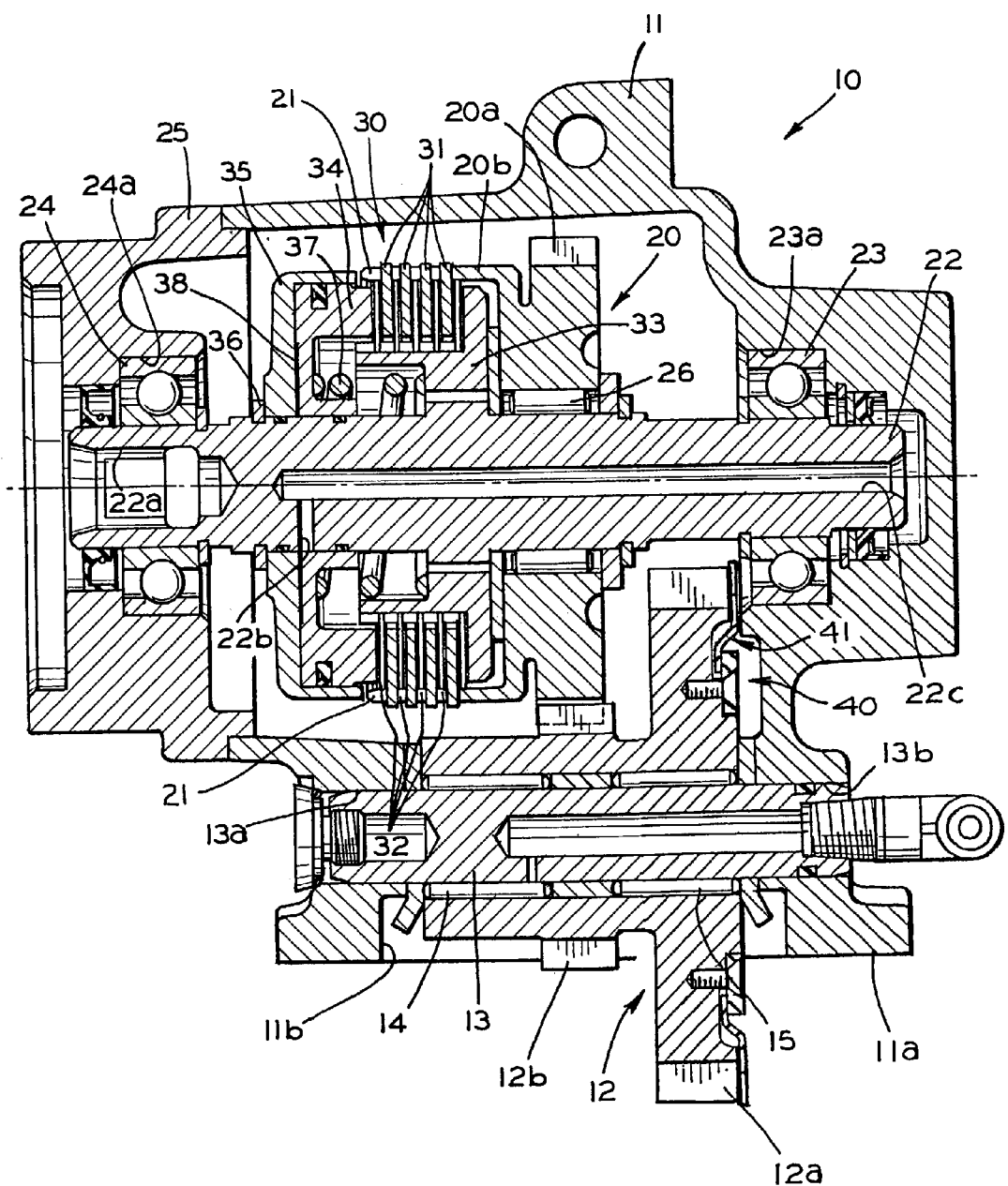
FIG. 1 is a sectional elevational view of a power take-off unit including a meshing gear assembly and a noise-reduction structure in accordance with this invention.

Referring now to the drawings, there is illustrated in FIG. 1 a power take-off unit, indicated generally at 10, in accordance with this invention. The illustrated power take-off unit 10 is, in large measure, conventional in the art and is intended merely to illustrate one environment in which this invention may be used. Thus, the scope of this invention is not intended to be limited for use with the specific structure for the power take-off unit 10 illustrated in FIG. 1 or with power take-off units in general. On the contrary, as will become apparent below, this invention may be used in any desired environment for the purposes described below.

The illustrated power take-off unit 10 includes a rigid hollow housing 11 having a mounting surface 11a formed thereon. An opening 11b is formed through the mounting surface 11a for a purpose that will be described below. An input gear 12 is rotatably supported in the housing 11 of the power take-off unit 10. To accomplish this, an input shaft 13 is journaled in a pair of aligned openings 13a and 13b formed through the housing 11 of the power take-off unit 10. Thus, the input shaft 13 is stationary relative to the power take-off unit housing 11. The input gear 12 is rotatably supported on the input shaft 13 by a pair of bearings 14 and 15.

The input gear 12 has a first toothed gear portion 12a and a second toothed gear portion 12b formed thereon. The first toothed gear portion 12a is relatively large in diameter. As shown in FIG. 1, a portion of the first toothed gear portion 12a extends through the opening 11b formed through the mounting surface 11a of the power take-off housing 11. Thus, when the power take-off unit 10 is mounted on a vehicle transmission (not shown) or other source of rotational power in the manner described above, the first toothed gear portion 12a of the input gear 12 extends through the opening 11b into meshing engagement with one of the transmission gears, typically a transmission gear that is rotatably driven whenever the vehicle engine is operated. As a result, the input gear 12 of the power take-of unit 10 is rotatably driven whenever the vehicle engine is operated.

The power take-off unit 10 further includes an output gear, indicated generally at 20, that is rotatably driven by the input gear 12. The output gear 20 is formed from a single, integral piece of material, including a toothed gear portion 20a and a bell portion 20b. The toothed gear portion 20a of the output gear 20 meshes with the second toothed gear portion 12b of the input gear 12. Thus, the output gear 20 is rotatably driven by the input gear 12 whenever the vehicle engine is operated. The bell portion 20b of the output gear 20 is generally hollow and cylindrical in shape and extends axially from the toothed gear portion 20a. The bell portion 20b has a plurality of slots 21 formed therein for a purpose that will be explained below.

The output gear 20 is rotatably supported in the housing 11 of the power takeoff unit 10. To accomplish this, an output shaft 22 is rotatably supported in a pair of aligned bearings 23 and 24. The bearing 23 is journaled in a recess 23a formed in the interior of the housing 11 of the power take-off unit 10. The bearing 24 is journaled in a recess 24a formed in a bearing cap 25 secured to the housing 11 of the power takeoff unit 10. Thus, the output shaft 22 is rotatably supported in the housing 11 of the power take-off unit 10. The output gear 20 is rotatably supported on the output shaft 22 by a bearing 26. The end of the output shaft 22 rotatably supported by the bearing 24 has an internal spline 22a, a key, or other similar structure formed therein to facilitate the connection thereof to a rotatably driven accessory (not shown).

The power take-off unit 10 also includes a clutch assembly, indicated generally at 30, for selectively providing a driving connection between the bell portion 20b of the output gear 20 and the output shaft 22. The clutch assembly 30 includes a first plurality of flat, annular clutch plates 31 that are connected to the bell portion 20b of the output gear 20 for rotation therewith. To accomplish this, each of the first plurality of clutch plates 31 has one or more radially outwardly extending protrusions formed thereon. The protrusions of the clutch plates 31 are received in the slots 21 formed in the bell portion 20b of the output gear 20 for rotation therewith. Thus, the first plurality of clutch plates 31 are rotatably driven by the output gear 20 whenever the vehicle engine is operated. The clutch assembly 30 further includes a second plurality of flat, annular clutch plates 32. The second plurality of clutch plates 32 is disposed in alternating fashion between the first plurality of clutch plates 31. The second plurality of clutch plates 32 are splined to a clutch gear 33 that, in turn, is splined onto the output shaft 22. Thus, the second plurality of clutch plates 32, the clutch gear 33, and the output shaft 22 are connected for rotation together as a unit. The clutch gear 33 is restrained from axial movement in one direction (toward the right when viewing FIG. 1) by abutment with the toothed gear portion 20a of the output gear 20.

The clutch assembly 30 further includes an annular clutch piston 34 that is disposed within a hollow cylindrical clutch cylinder 35. The clutch cylinder 35 has a closed end and an opened end. One end of the clutch piston 34 (the left end when viewing FIG. 1) is disposed within the clutch cylinder 35, while the opposite end of the clutch piston 34 (the right end when viewing FIG. 1) extends from the opened end of the clutch cylinder 35 adjacent to the first and second pluralities of clutch plates 31 and 32. Both the clutch piston 34 and the clutch cylinder 35 are supported on the output shaft 22. The clutch piston 34 is axially movable along the output shaft 34, but the clutch cylinder 35 is restrained from axial movement in one direction (toward the left when viewing FIG. 1) by one or more retaining rings 36 mounted on the output shaft 22. A coiled clutch spring 37 reacts between the clutch piston 34 and the clutch gear 33. As discussed above, the clutch gear 33 is restrained from axial movement in one direction (toward the right when viewing FIG. 1) by the toothed gear portion 20a of the output gear 20. Thus, the clutch spring 37 urges the clutch piston 34 axially in the opposite direction (toward the left when viewing FIG. 1) toward a disengaged position adjacent to the closed end of the clutch cylinder 35. In the disengaged position, the clutch piston 34 does not engage the first and second pluralities of clutch plates 31 and 32. Thus, the clutch plates 31 and 32 do not frictionally engage one another. As a result, the clutch gear 33 is disconnected from the output gear 20 so as to provide no rotatable driving connection therebetween. In this condition, the output shaft 22 is not rotatably driven by the output gear 20.

An annular clutch chamber 38 is defined between the clutch piston 34 and the closed end of the clutch cylinder 35. This annular clutch chamber 38 communicates through a first transverse passageway 22b and an axial passageway 22c formed through the output shaft 22 with a source of pressurized fluid (not shown). As is well known, when pressurized fluid is provided from the source to the annular clutch chamber 38, the clutch piston 34 is moved axially against the urging of the clutch spring 37 from the disengaged position to an engaged position. In the engaged position, the clutch piston 34 compresses the first and second pluralities of clutch plates 31 and 32 together into frictional engagement. As a result, the clutch gear 33 is connected to the output gear 20 so as to provide a rotatable driving connection therebetween. In this condition, the output shaft 22 is rotatably driven by the output gear 20.

Figure 2:
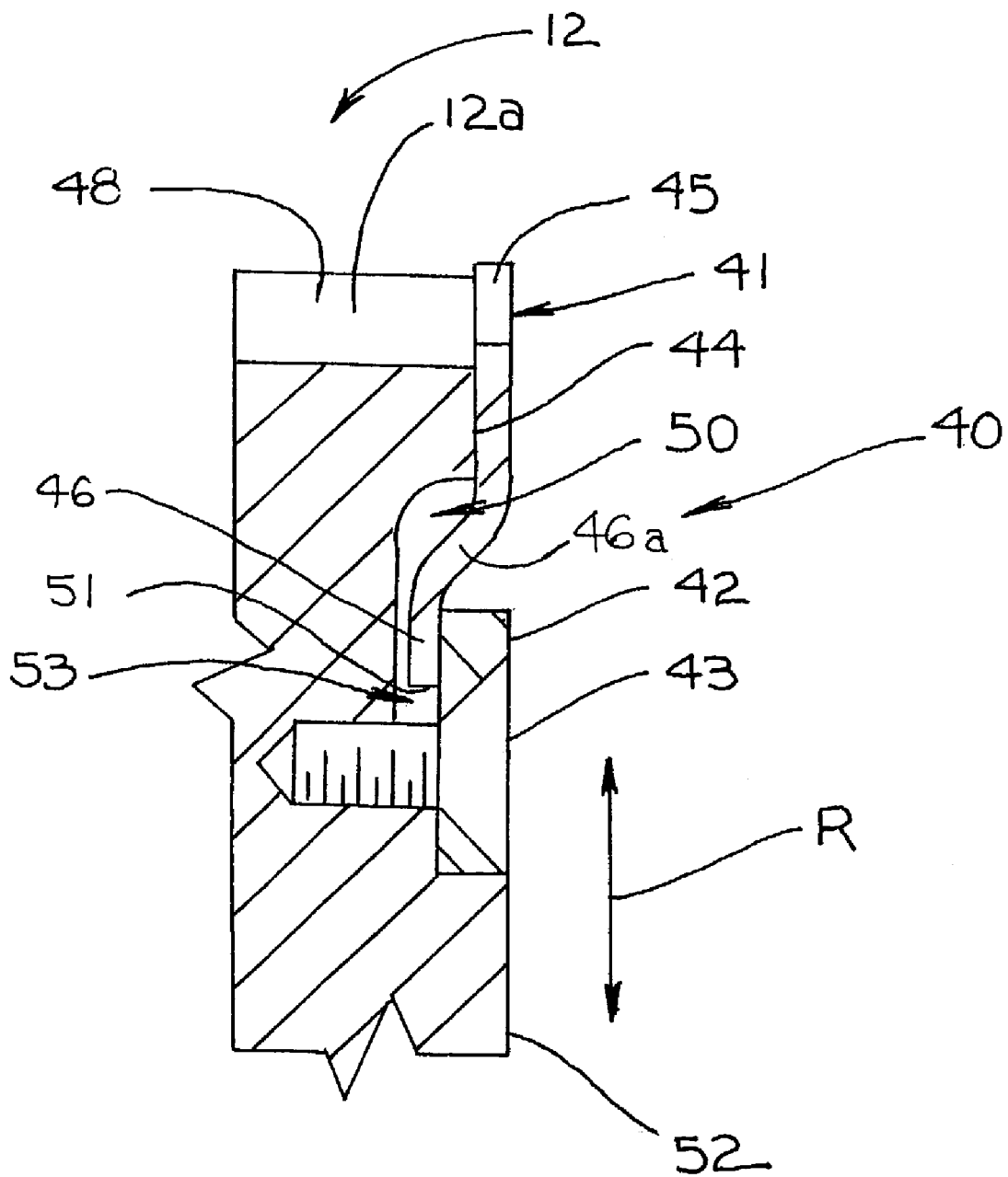
FIG. 2 is an enlarged sectional elevational view of portions of the meshing gear assembly and the noise-reduction structure illustrated in FIG. 1.
Figure 3:
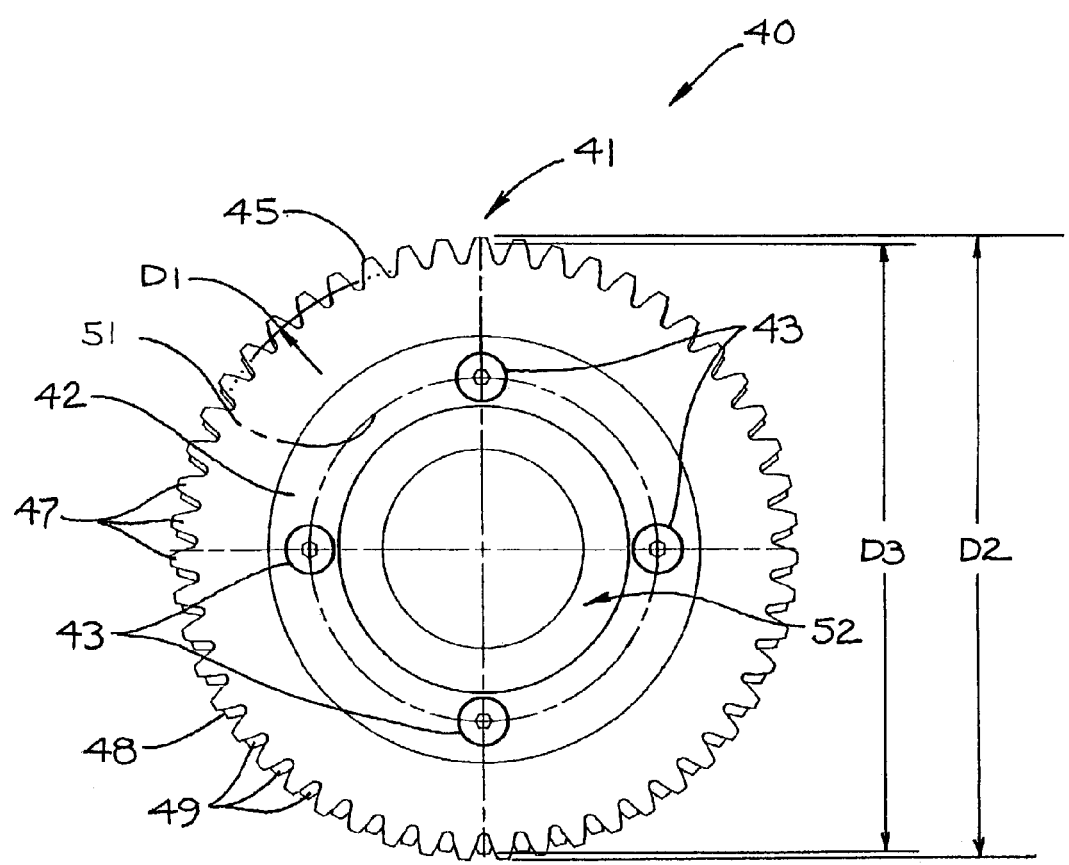
FIG. 3 is a front elevational view of the meshing gear assembly and the noise-reduction structure illustrated in FIGS. 1 and 2.

The illustrated power take-off assembly 10 further includes a noise-reduction structure, indicated generally at 40, in accordance with this invention. The structure of the noise-reduction structure 40 is illustrated in detail in FIGS. 2 and 3. As shown therein, the noise-reduction structure 40 includes a toothed disk, generally indicated at 41, that is retained on the first toothed gear portion 12a of the input gear 12. The toothed disk 41 can be retained on the first toothed gear portion 12a of the input gear 12 in any desired manner. For example, as shown in FIG. 2, the toothed disk 41 can be retained on the first toothed gear portion 12a of the input gear 12 by a retaining ring 42. The retaining ring 42 is secured to the first toothed gear portion 12a of the input gear 12 such that the toothed disk 41 is disposed therebetween. The retaining ring 42 can be secured to the first toothed gear portion 12a of the input gear 12 in any suitable fashion. For example, the retaining ring 42 can be secured to the first toothed gear portion 12a of the input gear 12 by one or more countersunk cap screws 43. Four circumferentially spaced countersunk cap screws 43 are shown in FIG. 3. The retaining ring 42 and the cap screws 43 hold the toothed disk 41 in frictional engagement with an axial face 44 of the first toothed gear portion 12a of the input gear 12, but allow the toothed disk 41 to be rotated relative to the first toothed gear portion 12a of the input gear 12. Additionally, the toothed disk 41 is supported in such a manner that it can move radially relative to the first toothed gear portion 12a of the input gear 12, as will become discussed further below.

As shown in FIG. 3, the illustrated toothed disk 41 of the noise-reduction structure 40 is annular in shape. The toothed disk 41 has an outer circumferential portion 45 and an inner circumferential portion 46. A plurality of teeth 47 (see FIG. 3) are formed on the outer circumferential portion 45 of the toothed disk 41. The first toothed gear portion 12a of the input gear 12 likewise has an outer circumferential portion 48. A plurality of teeth 49 are formed on the outer circumferential portion 48 of the first toothed gear portion 12a of the input gear 12. The number of teeth 47 formed on the outer circumferential portion 45 of the toothed disk 41 is different from the number of teeth 49 formed on the outer circumferential portion 48 of the first toothed gear portion 12a of the input gear 12. Preferably, the number of teeth 47 formed on the outer circumferential portion 45 of the toothed disk 41 exceeds the number of teeth 49 formed on the outer circumferential portion 48 of the first toothed gear portion 12a of the input gear 12 by one gear tooth, as illustrated in FIG. 3.

In a preferred embodiment of the invention, the teeth 47 formed on the outer circumferential portion 45 of the toothed disk 41 have a larger circumferential thickness than the teeth 49 formed on the outer circumferential portion 48 of the first toothed gear portion 12a of the input gear 12 at the operating pitch diameter D1 of the first toothed gear portion 12a of the input gear 12. In other words, when measured at the operating pitch diameter D1 of the first toothed gear portion 12a of the input gear 12, the circumferential width of each tooth 47 formed on the toothed disk 41 is preferably larger than the circumferential width of each tooth 49 formed on the first toothed gear portion 12a of the input gear 12. This relationship between the relative sizes of the teeth 47 and the teeth 49 is shown in FIG. 3. Also, the outer circumferential portion 45 of the toothed disk 41 can have a diameter D2 that is larger than a diameter D3 of the outer circumferential portion 48 of the first toothed gear portion 12a of the input gear 12. In other words, the outer diameter D2 of the toothed disk 41 can be larger than the outer diameter of the first toothed gear portion 12a of the input gear 12. The purpose of the larger circumferential thickness of the teeth 47 formed on the outer circumferential portion 45 of the toothed disk 41 and the larger diameter of the outer circumferential portion 45 of the toothed disk 41 will be explained below.

As shown in FIG. 2, the inner circumferential portion 46 of the toothed disk 41 is preferably axially offset relative to the outer circumferential portion 45 of the toothed disk 41 by a tapered intermediate portion 46a. Thus, the inner circumferential portion 46 of the toothed disk 41 is recessed within a recessed web portion 50 formed in the first toothed gear portion 12a of the input gear 12. The inner circumferential portion 46 of the toothed disk 41 is somewhat flexible relative to the outer circumferential portion 45 of the toothed disk 41, similar to a Belleville spring. The inner circumferential portion 46 of the toothed disk 41 is preferably engaged by the retaining ring 42 that is secured to the first toothed gear portion 12a of the input gear 12. The inner circumferential portion 46 of the toothed disk 41 has a bore formed therethrough that defines an inner circumferential surface 51. The inner circumferential surface 51 defined by the bore has a diameter that is larger than an outer diameter of a hub portion 52 of the first toothed gear portion 12a of the input gear 12. This provides a radial clearance, as indicated at 53 in FIG. 2, between the inner circumferential portion 46 of the toothed disk 41 and the hub 52 of the first toothed gear portion 12a of the input gear 12. The radial clearance 53 between the inner circumferential portion 46 of the toothed disk 41 and the hub 52 of the first toothed gear portion 12a of the input gear 12 permits the toothed disk 41 to be supported in such a manner that it can move radially (e.g., in either direction of the arrows R shown in FIG. 2) relative to the first toothed gear portion 12a of the input gear 12. The diameter of the inner circumferential surface 51 defined by the bore through the inner circumferential portion 46 of the toothed disk 41 is large enough so that radial movement of the toothed disk 41 is sufficiently unencumbered by the countersunk cap screws 43 that secure the retaining ring 42 to the first toothed gear portion 12a of the input gear 12.

In operation, the inner circumferential portion 46 of the toothed disk 41 is somewhat flexible, as stated above. The toothed disk 41 is secured to the first toothed gear portion 12a of the input gear 12 by the retaining ring 42 so that the outer circumferential portion 45 of the toothed gear 41 frictionally engages the axial face 44 of the first toothed gear portion 12a of the input gear 12. The first toothed gear portion 12a of the input gear 12 and the toothed disk 41 secured thereto mesh with a transmission gear (not shown) in the manner described above. As the transmission gear rotates, the toothed disk 41 and the input gear 12 rotate. However, the toothed disk 41 and the input gear 12 rotate at different speeds because the number of teeth 47 formed on the outer circumferential portion 45 of the toothed disk 41 is different from the number of teeth 49 formed on the outer circumferential portion 48 of the first toothed gear portion 12a of the input gear 12. As mentioned above, in the preferred embodiment of the invention, the number of teeth 47 formed on the outer circumferential portion 45 of the toothed disk 41 exceeds the number of teeth 49 formed on the outer circumferential portion 48 of the first toothed gear portion 12a of the input gear 12 by one tooth. Consequently, the toothed disk 41 will rotate faster that the input gear 12.

As stated above, the teeth 47 formed on the outer circumferential portion 45 of the toothed disk 41 have a larger circumferential thickness than the teeth 49 formed on the outer circumferential portion 48 of the first toothed gear portion 12a of the input gear 12 at the operating pitch diameter D1 of the first toothed gear portion 12a of the input gear 12. As a result, the toothed disk 41 meshes tighter with the transmission gear than the first toothed gear portion 12a of the input gear 12. This tighter meshing engagement is further produced because the outer circumferential portion 45 of the toothed disk 41 has a larger diameter D2 than the diameter D3 of the outer circumferential portion 48 of the first toothed gear portion 12a of the input gear 12. This tighter meshing engagement, in combination with the frictional engagement of the toothed disk 41 with the input gear 12, takes up backlash between the first toothed gear portion 12a of the input gear 12 and the transmission gear.

It should be appreciated by one of ordinary skill in the art that the tooth disk 41 according to the invention may be retained on the output gear 20, such as on the toothed gear portion 20a of the output gear 20. It should further be appreciated that the scope of the invention is not intended to be limited to the input gear 12 or output gear 20 shown and described but can be retained on other working gears as well. Moreover, a noise-reduction gear assembly structure formed by a working gear (i.e., the input gear 12 and the output gear 20 illustrated) and toothed disk 41 according to the invention are not intended to be limited for use with the power take-off unit 10 illustrated but can be used to reduce noise of any pair of meshing gears.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off unit that is adapted to connect a gear that is rotatably driven by a source of rotational energy to a driven accessory comprising:
   a hollow housing;
   an input gear assembly including an input gear having a plurality of input gear teeth that defines a first outer diameter and a toothed disk having a plurality of toothed disk teeth provided thereon that defines a second outer diameter that is larger than said first diameter defined by said plurality of input gear teeth, said toothed disk being frictionally engaged with said input gear and being supported for both rotational and radial movement relative to said input gear; and
   an output shaft supported within said housing and rotatably driven by said input gear, said output shaft adapted to be connected to rotatably drive the driven accessory.

2. The power take-off unit defined in claim 1 wherein said plurality of input gear teeth defines a first number of teeth, and wherein said plurality of toothed disk teeth defines a second number of teeth that is different from said first number of teeth.

3. The power take-off unit defined in claim 1 wherein said input gear includes a portion defining an outer dimension and said toothed disk includes a bore disposed about said portion and defining an inner dimension that is greater than said outer dimension.

4. The power take-off unit defined in claim 1 wherein said input gear includes a hub portion defining an outer diameter and said toothed disk includes a bore disposed about said hub portion and defining an inner diameter that is greater than said outer diameter.

5. The power takeoff unit defined in claim 1 wherein each of said plurality of input gear teeth defines a first circumferential width and wherein each of said plurality of toothed disk teeth defines a second circumferential width that is greater than said first circumferential width.

6. The power take-off unit defined in claim 1 further including a retaining ring that is secured to said input gear for retaining said toothed disk on said input gear.

7. The power take-off unit defined in claim 6 wherein said toothed disk includes an inner portion that is engaged by said retaining ring and an outer portion that is engaged with said input gear.

8. The power take-off unit defined in claim 7 wherein said inner portion of said toothed disk is flexible relative to said outer portion.

9. The power take-off unit defined in claim 7 wherein said toothed disk further includes an intermediate portion that extends between said inner portion and said outer portion.

10. The power take-off unit defined in claim 9 wherein said intermediate portion of said toothed disk is tapered relative to said inner portion and said outer portion.

* * * * *